UNITED STATES PATENT OFFICE.

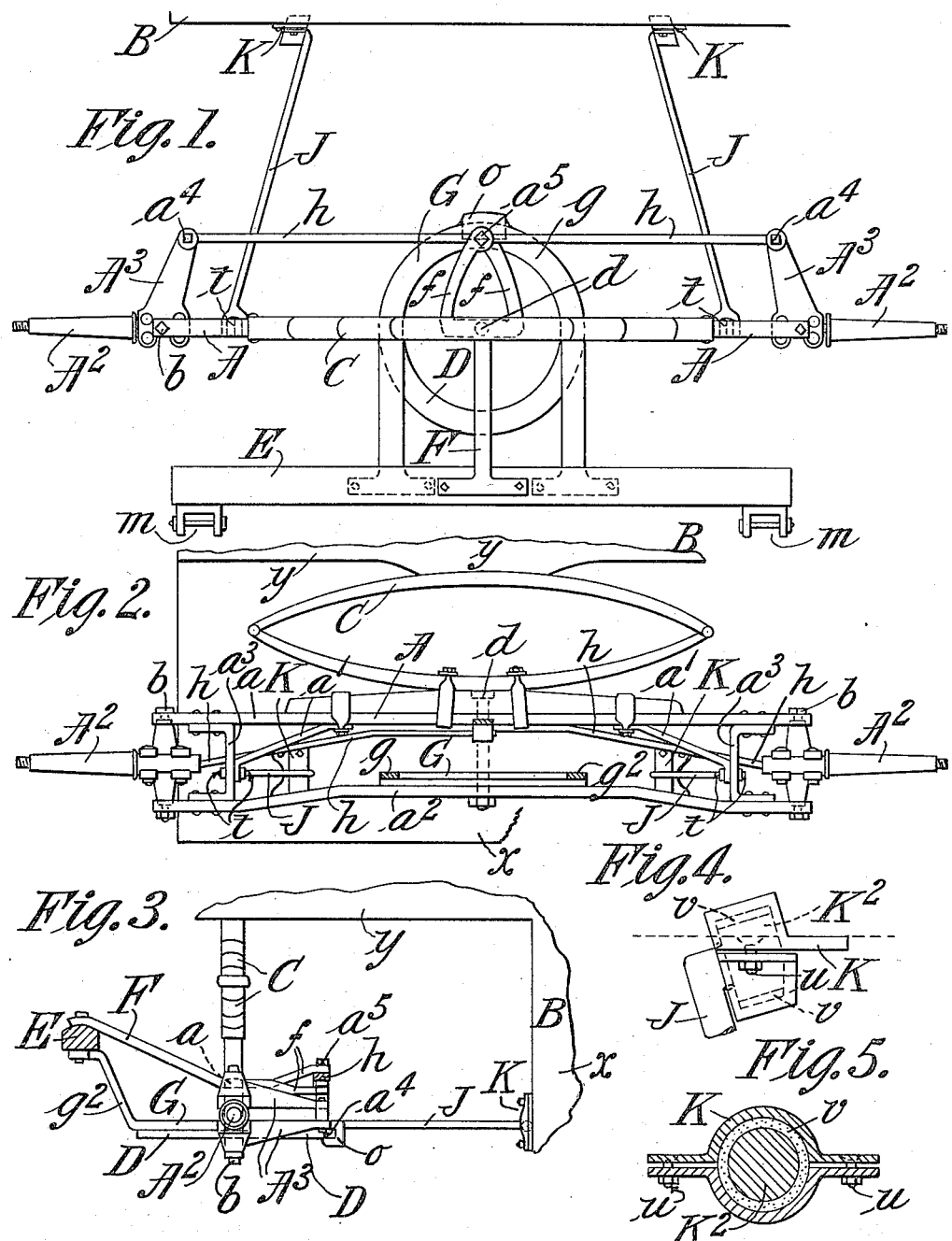

JOSEPH A. BOURBONNAIS, OF GRANBY, MASSACHUSETTS.

RUNNING-GEAR FOR WAGONS.

1,163,806.

Specification of Letters Patent.

Patented Dec. 14, 1915.

Application filed June 6, 1914. Serial No. 843,454.

*To all whom it may concern:*

Be it known that I, JOSEPH A. BOURBONNAIS, a British subject, and resident of Granby, in the county of Hampshire and State of Massachusetts, have invented certain new and useful Improvements in Running-Gear for Wagons, of which the following is a full, clear, and exact description.

This invention relates to running gear for wagons and is most especially adaptable for utilization in what is commonly known as a "drop body" or "low down body" extensively used by milk dealers and other venders.

The object of the invention is to provide a running gear of generally improved construction, and one in which, particularly, the front wheel may be deflected on short or sharp turns in the space forward of the depressed main portion of the body and the higher portion forward thereof which is spring supported on the axle frame.

The invention is described in conjunction with the accompanying drawings and set forth in the claims.

In the drawings:—Figure 1 is a plan view of the improved running gear; Fig. 2 is a front elevation of same as seen to the rear of the shaft connection bar. Fig. 3 is a side elevation. Figs. 4 and 5 are side and sectional views showing the detail construction of the improved means for connecting the reach and body.

In the drawing, in which the same parts are represented by the same reference characters throughout, A designates a transverse "axle frame" comprising upper and lower members $a$ $a^2$, united by cross ties $a^3$ and including braces $a^1$, as shown in Fig. 2. The axle frame has axle, or journal members $A^2$ for the wagon wheel at the opposite ends thereof, connected thereto for swinging movement in a horizontal plane by the axially vertical pivots $b$.

The wheels for supporting the forward end of the wagon are understood as provided on the axle members $A^2$; and said axle members have integral or rigidly connected arms $A^3$ which project in a general rearward direction but with inward inclinations as shown in Fig. 1.

The body B of the wagon has the forward portion thereof supported through the medium of the elliptic spring C by, and above the axle frame. In Fig. 3, $x$ represents the "drop" or depressed portion, of the body, while $y$ indicates the forward more elevated portion, spring supported above the axle frame and allowing space at the forward part of the vehicle within which the forward wheels when deflected may be accomodated without obstruction.

D represents a circular horizontal frame rigidly supported at the middle of the lower member $a^2$ of the axle frame A.

E represents a draft bar or shaft connection bar, transversely arranged forward of and normally parallel with the axle frame, the shafts in which the horse is to be hitched being understood as shackled at $m$ $m$ to the transverse bar E. The said bar E has a bar F rigidly connected to the middle portion thereof, as shown in Fig. 1, and longitudinally rearwardly extended to and also projecting by the rearward arms $f$ $f$ formed as a part thereof, rearwardly beyond the upper member $a$ of the axle frame A; and this bar F where it adjoins said member $a$ is by a vertical pivot axis $d$, jointed so as to have a swinging movement relatively to the axle frame when the draft bar E is swung because of the horse turning to the right or to the left as the case may be. The aforementioned arms or rear extensions $f$ $f$ of the rigid bar F are disposed in separation as represented in Fig. 3 so as to receive between their extremities, one of which is directly over the other, the ends of the links $h$ $h$, the outer ends of which links are pivotally connected to the extremities of the axle member arms $A^3$,—$A^4$ representing the pivots at the connections between the links $h$ and arms $A^3$ while $a^5$ represents the common pivot connecting the inner ends of both of the links and the rearward approached extremities of the aforesaid arms $f$ $f$.

G represents a frame comprising an arc shaped horizontal portion $g$ which rests, and may have partial revoluble movement in the manner of a turn-table, or fifth wheel on the rear portion of the aforementioned circular frame D, the said rear portion of the frame D being engaged by an angular lug or flange $o$ formed as a part of the frame G, and to be perceived in Figs. 1 and 3 of the drawing; and the said circular frame, furthermore, comprises opposed forward and upwardly extending continuations of the semi-circular or arc shaped portions, which portions $g^2$ are rigidly connected with the shaft connection bar E.

If the horse is steered to the right, the left hand wheel will be deflected inwardly and the right hand wheel outwardly because of the swinging of the draft bar or transverse member E to which the shafts are shackled because of the consequent swinging of the rigid bar F and its arms $f$ $f$, and the thrust of one link and draft of the other relative to the axle member arms $A^3$.

J J represent reach bars or rods shackled, as indicated at $t$ to the axle frame on horizontal pivot axes and also connected pivotally on horizontal axes to a forward part of the body,—said reach rod as shown in Fig. 1 inclining somewhat inwardly in their extensions from the axle frame to the body. The reach rod connections, for swiveling action with the body are made as follows: Each reach rod at its rear end has a transversely extended circular member $K^2$, somewhat enlarged beyond the diameter of the reach rod proper, and this transverse enlargement circular member or head is inclosed within a socket comprised in a bracket K which consists of separable members, one of which is mortised into the body and bolted thereto while the other is by bolts and nuts $u$ contractibly engaged with the member of the bracket which is fixed to the body. The transversely disposed reach rod head $K^2$ is encircled by a compressible material $v$, such for instance, as leather, this equipment being such that after protracted use any developed wear may be taken up by tightening the nuts, at $u$, whereby the outer bracket member has a more contracted relation to the inner bracket member, and the socket between such members being, therefore, correspondingly contracted.

I claim:—

1. In a vehicle the combination with a transverse axle frame comprising upper and lower members and having axle or journal members for the wagon wheels pivoted to the axle frame at the ends thereof, the body having the forward portion thereof spring supported on said frame, a circular horizontal frame rigidly supported on the lower member of the axle frame, a transverse shaft connection bar forward of the axle frame having a bar rigidly connected to the central portion thereof, longitudinally extended to, and rearwardly beyond the frame, and pivotally connected on a vertical axis to the middle of the upper member of the frame, a frame comprising an arc shaped horizontal portion resting on the circular frame and having opposed forwardly and upwardly extending continuations rigidly connected with the shaft connection bar and links connecting the rearward extension of said longitudinal bar and the axle-member-arms.

2. In a vehicle the combination with a transverse axle frame comprising upper and lower members and having axle or journal members for the wagon wheels pivoted to the axle frame at the ends thereof, the body having the forward portion thereof spring supported on the lower member of the axle frame, a circular horizontal frame rigidly supported on the lower member of the axle frame, a transverse shaft connection bar forward of the axle frame having a bar rigidly connected to the central portion thereof, longitudinally extended to, and rearwardly beyond the frame, and pivotally connected on a vertical axis to the middle of the upper member of the frame, a frame comprising an arc shaped horizontal portion resting on the circular frame and having opposed forwardly and upwardly extending continuations rigidly connected with the shaft connection bar, links connecting the rearward extension of said longitudinal bar and axle-member-arms, and reach bars pivotally shackled to the outer end portions of the axle frame, rearwardly extended from the latter to and having a pivotal connection with a forward portion of the wagon body.

Signed by me at Springfield, Mass., in presence of two subscribing witnesses.

JOSEPH A. BOURBONNAIS.

Witnesses:
    WM. S. BELLOWS,
    G. R. DRISCOLL.

Copies of this patent may be obtained for five cents each, by addressing the "Commissioner of Patents, Washington, D. C."